United States Patent [19]
Liou

[11] Patent Number: 6,094,409
[45] Date of Patent: *Jul. 25, 2000

[54] VIBRATION REDUCTION APPARATUS FOR THE TRAVERSE OF A TRAY-TYPE DISK PLAYER

[75] Inventor: Dong-Yih Liou, Taoyuan, Taiwan

[73] Assignee: Acer Peripherals, Inc., Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 09/061,641

[22] Filed: Apr. 16, 1998

[30] Foreign Application Priority Data

Dec. 11, 1997 [TW] Taiwan ................... 86220592

[51] Int. Cl.⁷ .................................. G11B 33/08
[52] U.S. Cl. .......................................... 369/75.2
[58] Field of Search ................... 369/75.2, 263, 369/246, 247, 248; 360/97.02, 97.03, 97.04; 248/634, 71

[56] References Cited

U.S. PATENT DOCUMENTS

| | | | |
|---|---|---|---|
| 5,138,529 | 8/1992 | Colton et al. | 361/816 |
| 5,740,011 | 4/1998 | Kobayashi et al. | 361/685 |
| 5,751,551 | 5/1998 | Hileman et al. | 361/753 |
| 5,768,249 | 6/1998 | Ro et al. | 369/263 |
| 5,820,048 | 10/1998 | Shereyk et al. | 248/68.1 |

*Primary Examiner*—William Klimowicz
*Assistant Examiner*—Angel Castro
*Attorney, Agent, or Firm*—Fulbright & Jaworski LLC

[57] ABSTRACT

A disk player is provided to include a tray and a chassis, a traverse and an elastic device. Responsive to an instruction from a user, the tray selectively feeds in and ejects out. The chassis defines an inner side wall and inner bottom wall with the inner side wall extending out at a predetermined location to form a first protrusion and with the inner bottom wall extending out at another predetermined location to form a second protrusion. The first protrusion and second protrusion together defines a space. A traverse has a bracket on which a V-shaped retainer is provided with a first end thereof connected to one end of the bracket. The V-shaped retainer and the first protrusion define a slot in which the elastic device is disposed. The elastic device presses the V-shaped retainer and the first protrusion such that the vibration of the bracket during operation of the disk player is lowered.

1 Claim, 4 Drawing Sheets

VIBRATION REDUCTION APPARATUS FOR THE TRAVERSE OF A TRAY-TYPE DISK PLAYER

FIELD OF INVENTION

The invention relates to an apparatus for reducing vibration of the traverse of a tray-type disk player.

BACKGROUND OF INVENTION

In accordance with the disposition of disc within a CD ROM player, the CD-ROM player may be classified as drawer type, tray type or caddy type. As well known in the arts, for the drawer type CD-ROM player, the disc is directly mounted onto the turn table of a loader. In response to the instruction of user, the loader and the disc therein move inward or outward with respect to the CD-ROM player. Like the 3.5 inch floppy disc drive, a disc is mounted within a caddy which is then inserted into the CD-ROM player.

In FIG. 1, the relationship between the traverse and other mechanisms of a conventional disc player, while the tray is being ejected out from the player, is shown. In FIG. 2, the relationship between the traverse and other mechanisms of a conventional disc player, while the tray is being fed into the player, is shown. In FIG. 1, the traverse 26 is at its highest position and the movable arm 20 is also at its highest position due to the action of the spring 28. In FIG. 2, the traverse 26 is at its lowest position pressing the movable arm 20. In other words, the traverse 26 should have capability of minor angular displacement. Furthermore, in FIGS. 1, 2, the disc 24 and turntable 260 are shown.

To meet the requirement of minor angular movement of the traverse, the conventional mechanism, as shown in FIG. 3(A), provides a first protrusion 311 at an inner side wall of the chassis 31 and, at the inner bottom wall, provides a second protrusion 312. As shown, the first protrusion 311 and second protrusion 312 together define a space. Correspondingly, each root 262 of the traverse 26 extends downwardly to form a V-shaped retainer 261 which is disposed within the space. The first end of the V-shaped retainer 261 is connected to the root 262 and the second end of the V-shaped retainer 261 presses against the bottom side of the first protrusion 311. A slot is presented between the root 262 and the first protrusion 311. In response to the action of the tray, the traverse 26 correspondingly lifts or sinks with the V-shaped retainer 261 as its axis. The FIG. 3(A) shows state in which the traverse 26 lifts to its highest position and FIG. 3(B) shows state in which the traverse 26 sinks to its lowest position.

The above recited mechanism does not have any problem when utilized in the low speed disc player. However, it is found this mechanism creates not only higher noise but track seeking problem during disc operation due to higher vibration phenomenon with respect to the traverse 26.

SUMMARY OF INVENTION

To overcome the mentioned issue, the invention provides a vibration reduction device to lower vibration of the traverse in the environment of the type.

Another object of the invention is to reduce the noise of the disc player during operation.

A disk player is provided to include a tray and a chassis, a traverse and an elastic device. Responsive to an instruction from a user, the tray selectively feeds in and ejects out. The chassis defines an inner side wall and inner bottom wall with the inner side wall extending out at a predetermined location to form a first protrusion and with the inner bottom wall extending out at another predetermined location to form a second protrusion. The first protrusion and second protrusion together defines a space. A traverse has a bracket on which a V-shaped retainer is provided with a first end thereof connected to one end of the bracket. The V-shaped retainer and the first protrusion define a slot in which the elastic device is disposed. The elastic device presses the V-shaped retainer and the first protrusion such that the vibration of the bracket during operation of the disk player is lowered.

BRIEF DESCRIPTIONS OF THE DRAWINGS

FIG. 1 discloses a section view in which the relationship between the traverse and other mechanisms of a conventional disc player is shown while the tray is being ejected out from the player which is vertically disposed.

FIG. 2 discloses a section view in which the relationship between the traverse and other mechanisms of a conventional disc player is shown while the tray is being fed into the player which is vertically disposed.

FIG. 3(A) discloses the traverse bracket of one conventional approach in one state.

DETAILED DESCRIPTION OF THE EMBODIMENT

Figure 1:
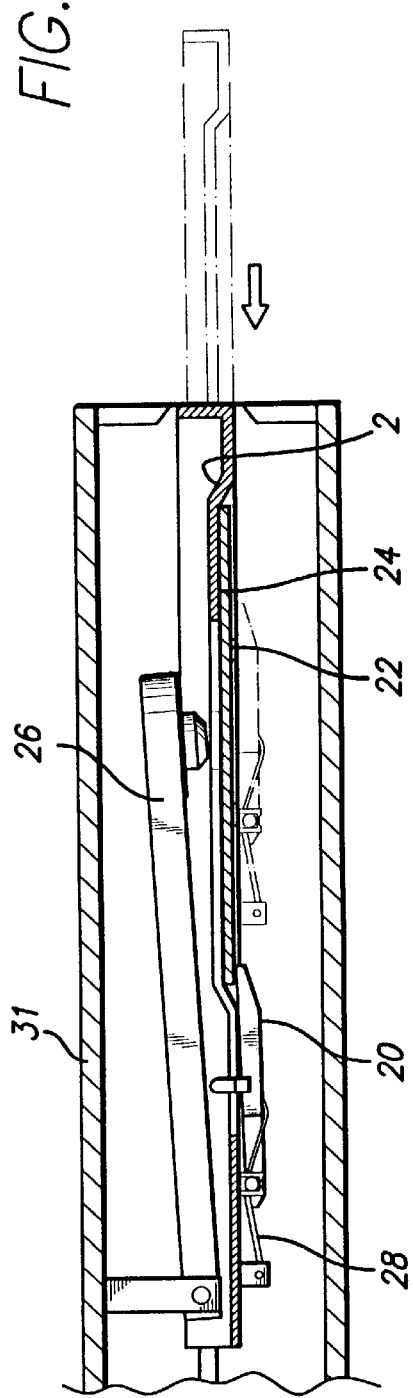
Figure 2:
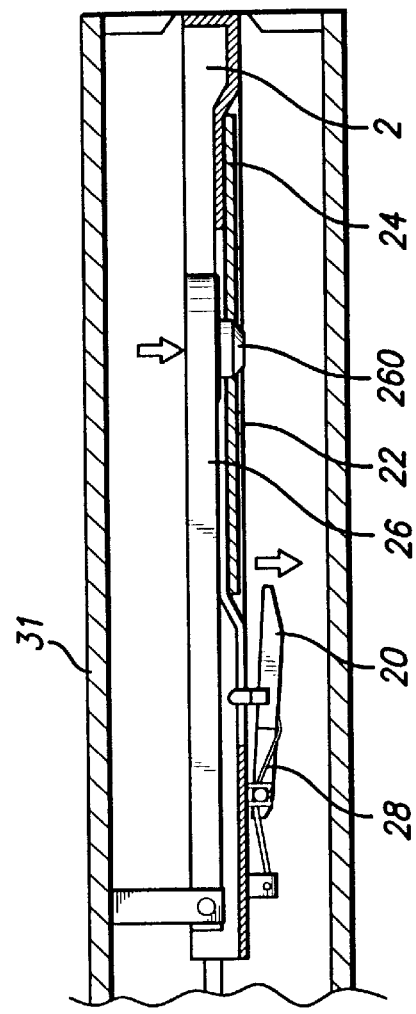
Figure 3A:
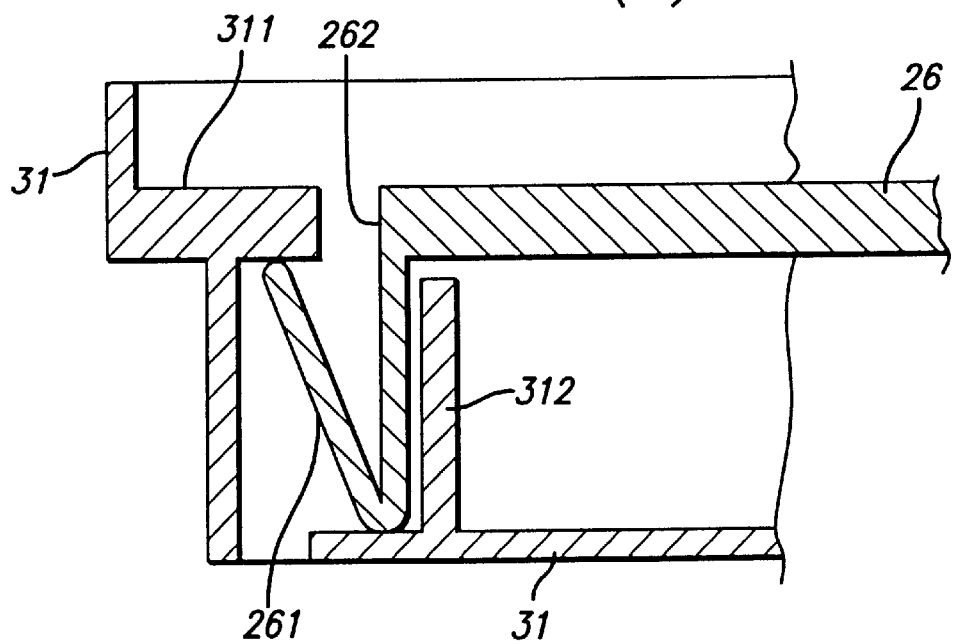
FIG. 3(B) shows another state of the traverse bracket in FIG. 3(A)
Figure 3B:
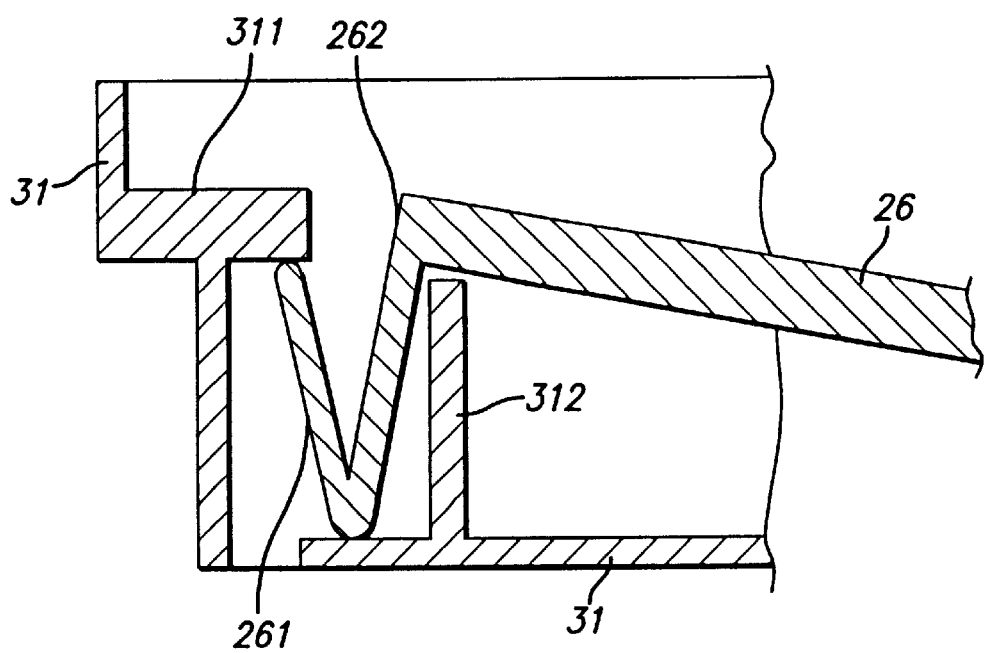
Figure 4:
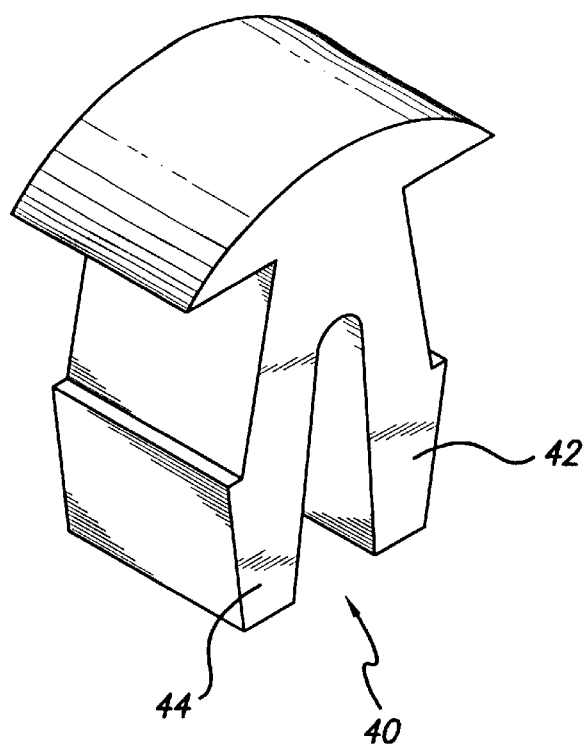
FIG. 4 depicts one elastic device in accordance with the invention.
Figure 5:
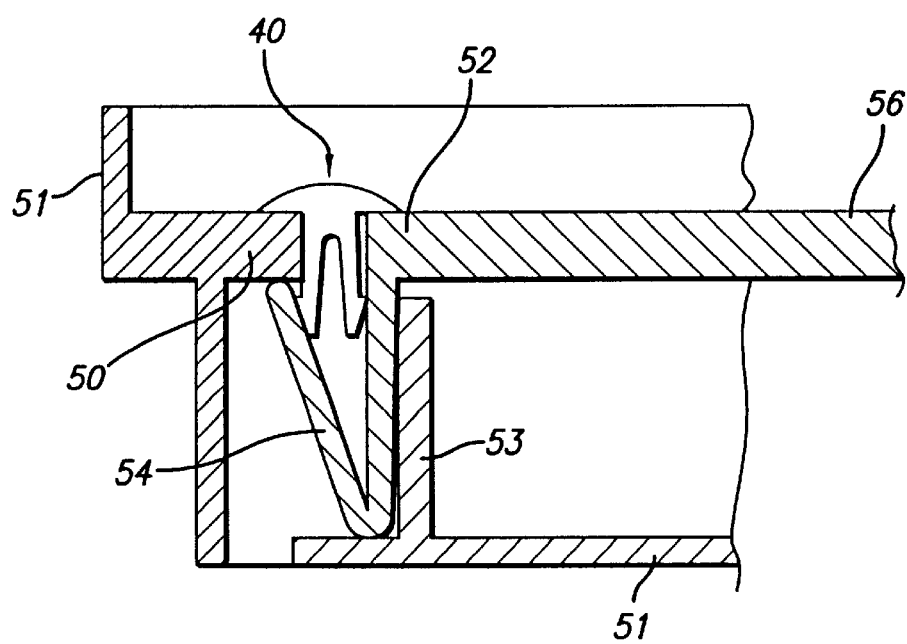
FIG. 5 shows the connection relationship between the elastic device, chassis and traverse bracket in accordance with the invention.

Referring to FIG. 4 and FIG. 5, the present invention provides an elastic device 40 disposed within the slot defined by the first protrusion 50, retainer 54, and the root 52 of retainer 54. The elastic device 40 functions to press against the retainer 54 and the first protrusion 50 to reduce the vibration associated with the traverse 56 during operation. The elastic device 40 is provided with a closed-end longitudinal slot to form two arms 42, 44. The distance between two arms 42, 44 will change responsive to the force applied to the elastic device 40 along the transverse direction. Therefore, after assembly, the elastic device 40 with adjustment transverse distance may press against the retainer 54 and the first protrusion 50 to reduce the vibration of the traverse 56.

The first protrusion 50 extends from the inner side wall of the chassis 51 and the second protrusion 53 extends from the inner bottom wall of the chassis 51. As shown, the first protrusion 50 and second protrusion 53 together define a space for accommodating the retainer 54. In response to the action of the tray, the traverse 56 correspondingly lifts or sinks with the V-shaped retainer 54 as its axis.

Figure 6:
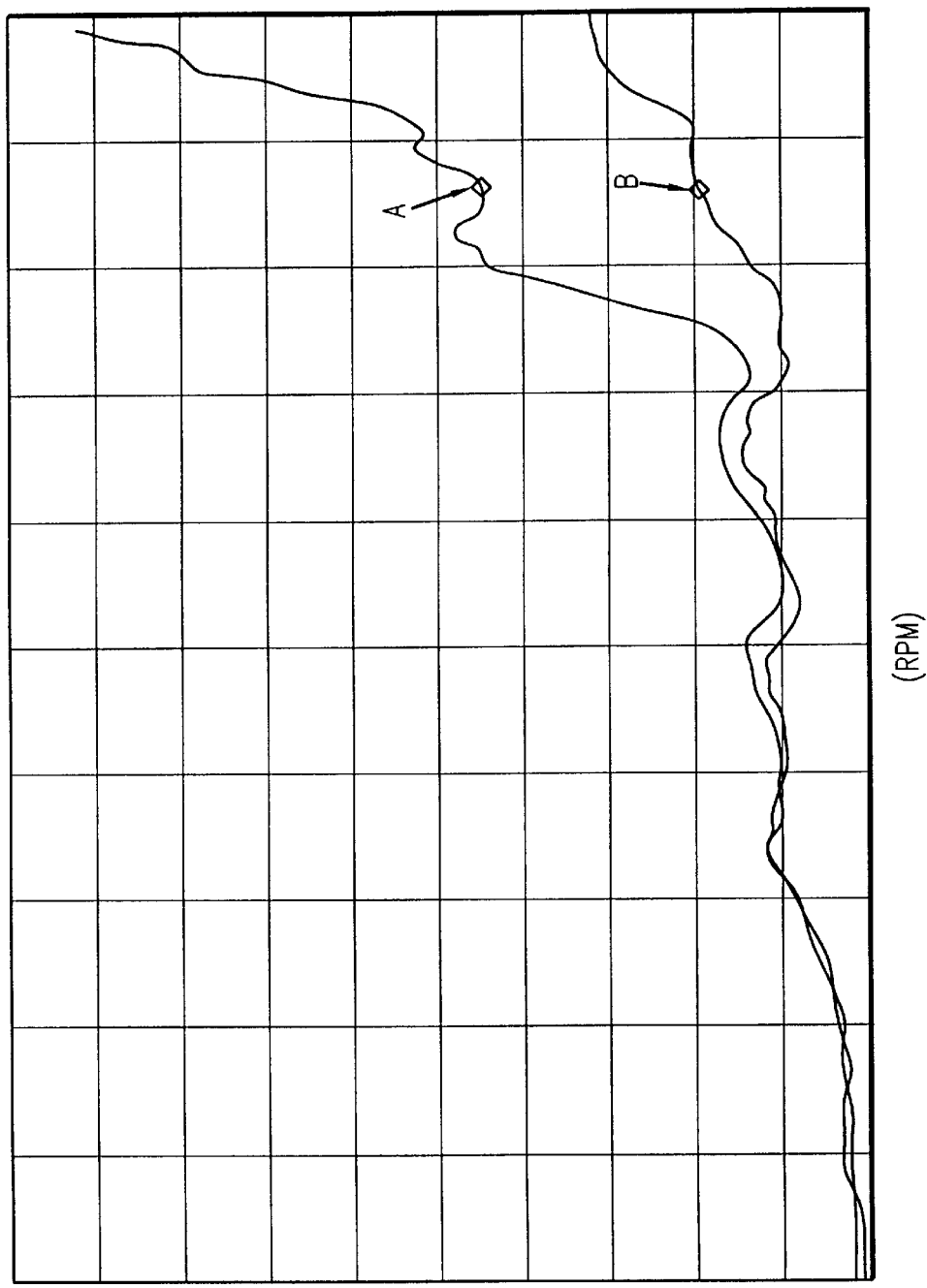
FIG. 6 shows the benefit of the invention compared to the conventional one.

The curve A of FIG. 6 is the vibration force curve of one conventional disc player while the curve B is the vibration force curve with introduction of the invention. In FIG. 6, the unit along Y axis is milli-Gram rms/div, with rms being root mean sqaure. It is shown that, in high RPM region, the invention apparently reduce the vibration force. Correspondingly, the operation noise is therefore reduced.

What is claimed is:

1. A disk player, the disk player including a chassis, and the chassis defining an inner side wall and inner bottom wall, the inner side wall extending out at a predetermined location to form a first protrusion, the inner bottom wall extending out at another predetermined location to form a second protrusion, the first protrusion and second protrusion together defining a space, the disk player comprising:

a traverse having a bracket, a V-shaped retainer is provided with a first end and a second end, the first end of the V-shaped retainer being connected to one end of the bracket, the V-shaped retainer being disposed within said space such that the traverse is movably retained by the first and second protrusions, said first end of said V-shaped retainer and the V-shaped retainer defining a slot, the slot being slightly variable during movement of the traverse, said second end of the V-shaped retainer pressing against one surface of the first protrusion;

elastic means, having a closed-end longitudinal slit to form two arms, disposed within the slightly variable slot for pressing the V-shaped retainer and said second end of the V-shaped retainer which lowers vibration of the bracket operation of the disk player.

* * * * *